April 30, 1963     W. H. W. SCHULLER     3,087,830
METHOD AND APPARATUS FOR PRODUCING A DRY MAT SHEET
Filed Dec. 14, 1959     3 Sheets-Sheet 1
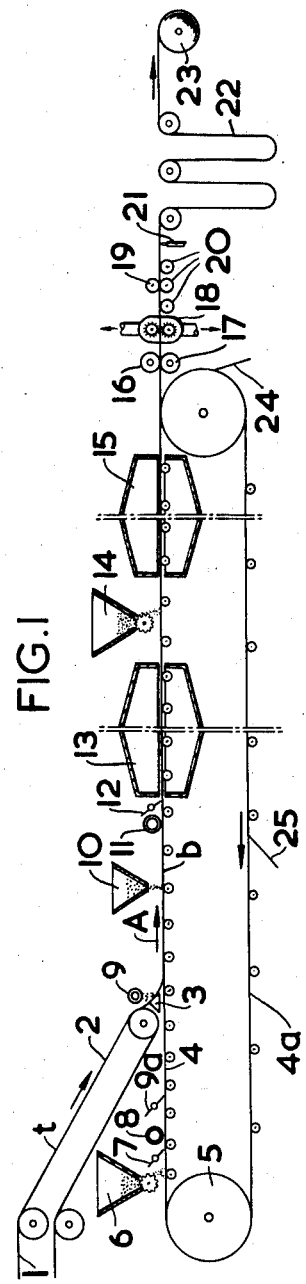
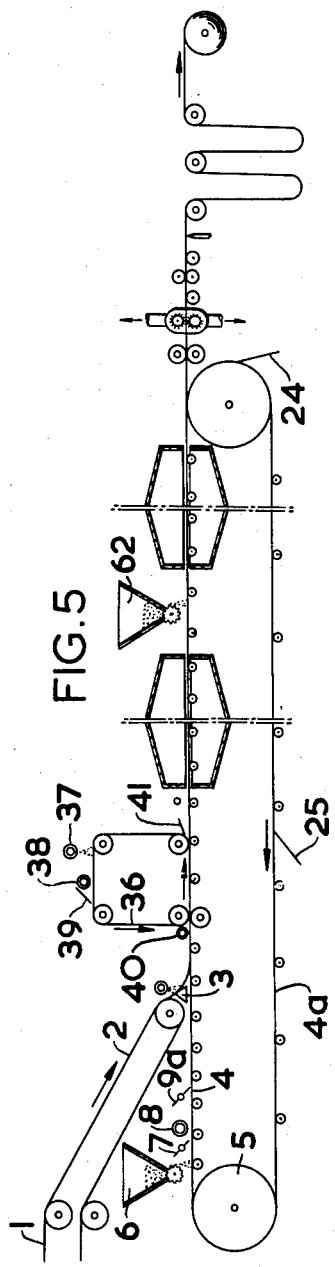
INVENTOR
WERNER H. W. SCHULLER
BY
Morgan, Finnegan, Durham & Pine
ATTORNEYS.

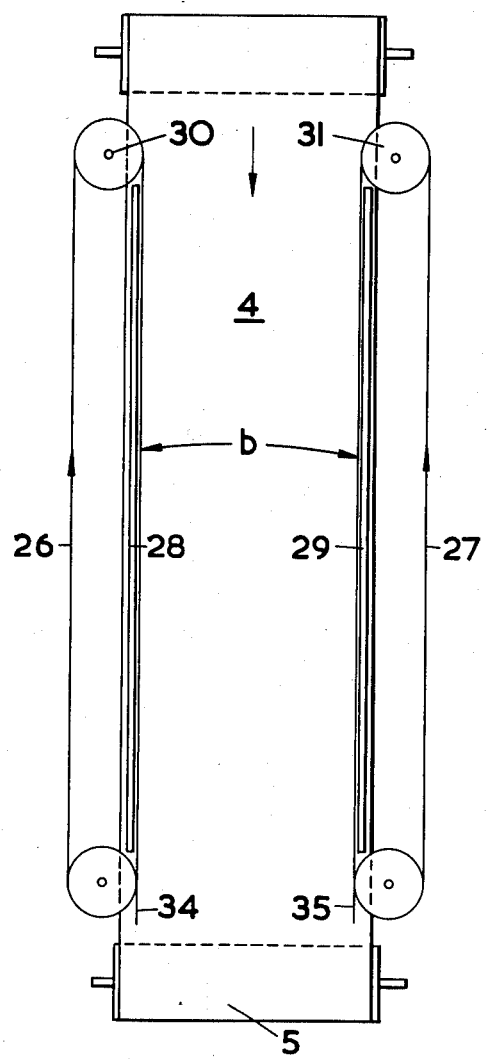

April 30, 1963 W. H. W. SCHULLER 3,087,830
METHOD AND APPARATUS FOR PRODUCING A DRY MAT SHEET
Filed Dec. 14, 1959 3 Sheets-Sheet 3

INVENTOR
WERNER H. W. SCHULLER
BY
Morgan, Finnegan, Durham + Pine
ATTORNEYS.

United States Patent Office 3,087,830
Patented Apr. 30, 1963

3,087,830
METHOD AND APPARATUS FOR PRODUCING
A DRY MAT SHEET
Werner Hugo Wilhelm Schuller, Fort Saskatchewan,
Alberta, Canada
Filed Dec. 14, 1959, Ser. No. 859,361
Claims priority, application Great Britain Dec. 17, 1958
7 Claims. (Cl. 117—32)

In the production of coated mats, for example for roofing pipe and cable wrapping or the like, it is known to impregnate glass fibre bonded mats with a bituminous composition such as asphalt or tar. For such purpose the bonded mat is applied on rolls and coated on a conventional roofing machine by being drawn through a bath of the bituminous composition. This operation involves considerable pull on the mat, and it is important, therefore, that the glass fibre mat should have adequate tensile strength. To achieve this the randomly disposed glass fibres are bonded with a suitable binder, generally a melamine urea or phenolic resin. Due to the danger of tearing at the edges and the rough treatment to which the rolls are subjected in transit to the roofing factories, the tensile strength of the mat often proves inadequate. The quality, therefore, is improved by incorporating longitudinal glass fibre reinforcing strands or slivers.

This known method involves a number of disadvantages, one being the comparatively high cost of the binder, the other the necessity for using a big drying oven for drying the mat and curing the thermosetting binders. For an efficient and high speed operation it is therefore necessary to use long and costly drying ovens with complicated temperature control systems.

Another problem is that the thermosetting binder reduced the elongation of the mat to such an extent as to render it unsuitable for certain uses, for example, for special roofings, cable wrappings and the like. Binders which provide for flexibility and extensibility of the mat such, for example, as thermoplastic binders or latices are unsuitable due to their low softening point, if brought in contact with hot bitumen at 180–210° C.

In addition, the tensile strength requirements have been considerably increased within the last three years. This, however, has led to a further reduction of the mat elongation up to limits where it is dangerous now to apply roofing cable wrapping materials in accordance with the generally accepted methods.

Up to the present, the known glass mat has been bonded with a binding agent in such manner as to make a comparatively stiff sheet of approximately 15–30 thou (1 thou=0.001″) to be impregnated and coated in a conventional roofing machine. The finished product then consisted of a glass fibre sheet embedded between a top and bottom coating of asphalt. Thus up to the present it has proved impossible to reinforce the total body of the roofing product with glass fibre.

Tests were made with a view to producing coated materials such as, for example, for roofing and the like, with an increased elongation factor by passing a binder-free mat through a coating composition and subsequently sanding the coating. This method proved very difficult because of the little tension which could be applied which made it impossible to draw the mat at the required speed through the coating bath.

In accordance with the invention, all these disadvantages are avoided.

The invention relates to a method of producing roofing, water-proofing pipe and cable wrapping materials and the like, using a binder-free glass fibre mat, depositing said mat on a conveyor belt or on a moving surface which is advantageously dusted or sanded and on to which the coating material is applied in hot liquid condition, in cold granules, or in the form of powder and then heated and subsequently rolled under pressure so as to cause the granules or powder or asphalt composition to be forced into the body of the glass fibre mat and to form with it an integrated whole.

Thus it is a feature of the invention first to produce a binder-free glass fibre mat in loose matted form in which state it is admirably adapted to permit of complete penetration of a coating material of any suitable kind which will pass completely through the interstices between the fibres so that when rolled, the product is a composite, integrated and indivisible unit in which the tear and tensile strength as well as the elongation are considerably increased far beyond that of similar products in which the fibre mat has been first bonded with a material such as melamine urea or phenolic resins and then coated on one or both sides with a bituminous layer.

According to the method of the invention, with a view to reducing considerably the costs and saving time, the method is carried out in single-line production, the starting product being loose fibres in matter form to which are applied a coating material in hot condition either in liquid or granulated form.

In the case of a coating with liquid coating material this will pass through the interstices of the mat combining with the dusting material which has been sprinkled on the belt before depositing the glass fibres in matted form.

In the case of a coating applied by using materials in powder or granulated form, the unit carrying the grains or powder is heated so as to melt the grains or powder causing them to penetrate into and through the mat, the operation being completed by rolling the impregnated mat either with one or two rollers and cooling the product which may then be wound onto rolls or cut into strips as may be required to a predetermined pattern or shape.

It will thus be understood that in accordance with the method of the invention the coating operation is carried out without exercising any pull on the mat itself, the mat being carried on a conveyor or the equivalent.

The product is incomparably higher in elongation as well as tear and tensile strength than similar coated bonded mats hitherto produced by virtue of the character of the impregnation whereby the contact between individual fibres and coating material is so intimate that the fibres serve to the highest extent as a reinforcement throughout the substance with which they have been impregnated.

The mat of loose fibres may preferably be of a thickness of 1/8″ or more or less.

The method and apparatus according to the invention are diagrammatically illustrated by way of example in the accompanying drawings and are hereinafter described with reference to these drawings in which:

FIGURE 1 shows a vertical section on a substantially reduced scale of apparatus for the production of roll roofing, pipe or cable wraps or the like;

FIGURE 2 is a plan view of components of the conveyor plant shown in FIGURES 1 and 5;

FIGURE 5 shows an alternative construction of apparatus for coating the mat according to the invention.

Figure 3:
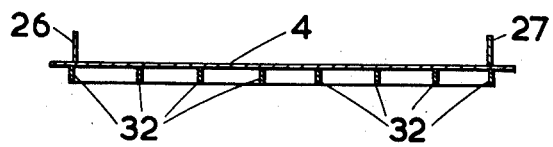
FIGURE 3 shows a further or alternative component of the conveyor plant shown in FIGURES 1 and 5.

As shown in FIGURE 1, the binder-free fibre mat *t* moving from the position of production, for example on a horizontal conveyor belt 1, is passed along a continuation 2 of the conveyor belt 1 extending at an oblique angle to the belt 1 and over a mat supporting bridge member 3 on to an intermediate portion of a horizontally disposed conveyor belt 4, advantageously made of flexible sheet metal which moves in the direction of the arrow A. At the forward end the upper surface of the conveyor belt 4 is covered with sand after passing over the reversing roller 5 and in front of the position at which the binder-free fibre mat *t* is fed on to the belt. For the purpose a sand feed device or hopper 6 is mounted in the space between the inclined conveyor belt continuation 2 and the belt 4. Just beyond the hopper 6 is mounted a scraper 7. By means of the scraper 7 and by means of a suction pipe 8 an exact level of sand, limestone or other dusting material on the mat is maintained, any excess materials are removed by suction. As the quality and good surface appearance of the finished coated material depends on the surface of the sand, it is essential to maintain a satisfactorily and uniformly sanded or dusted surface on the belt.

In order to ensure this an additional scraper 9a is advantageously mounted at a position beyond the suction pipe 8.

The binder-free mat *t* moving from the position of production is thus put on the sanded surface of the belt 4.

Shortly before this the binder-free mat *t* may be lightly pre-sprayed with a bituminous composition by means of a spray nozzle 9. The preliminary spraying serves to give the mat at this position a certain strength. Because no pull is exercised on the mat and the spray of bitumen cools rapidly, there is no risk that the mat might tear apart during the following operation.

The actual coating with the bituminous composition is applied under pressure by means of a slotted nozzle 10, the slot extending over the full width of the belt 4. Any equivalent means such, for example, as spray nozzles which carry out transverse or reciprocating motions or coating rollers with scrapers or the like may alternatively be used. The width of slot of the nozzle may be varied and the nozzle can be heated by means of a steam jacket or by an electric resistance heater so that the heated bituminous composition applied under pressure from the nozzle forms a substantially liquid coating film on the mat as indicated by reference *b* and then penetrates thoroughly through the body of the mat.

The same effect may be achieved by applying granulated or powdered asphalt or tar in cold condition and in controlled quantities on to the mat surface, the substance applied being heated by known heating means and then rolled into the body of the mat.

The mat thus coated is then passed through a cooling device 13, for example an air fan blowing cold air on to the top and bottom surfaces of the mat. The mat is then conveyed past a sanding device 14 by means of which the top of the sheet is sanded and finally through a further cooling device 15 of a kind known in roofing manufacture.

The inclined scraper 12 provided at a position beyond the suction nozzle 11 is advantageously heated and mounted at an angle to the direction of movement of the mat so that any excess of the bituminous composition is forced away to one side. An alternative method of providing a smooth bituminous surface is, instead of the scraper, to use a heated roller movable transversely to the direction of movement of the conveyor belt.

After the steps of impregnating and coating the mat with a bituminous compositon, and after the top and bottom surfaces have been sanded and the coating material has set, the product is removed from the conveyor belt and is then passed between a pair of pressure rollers 16, 17 by which the sand is pressed into the coated surfaces. If necessary, the coated mat is passed to means, as for example brushes for brushing off excess sand or dust and finally to a slitter which in the example illustrated in FIGURE 1 consists of two slitting wheels 19, 20 provided either to trim the edges of the finished product or to slit the coated product into smaller widths. In order to seal the trimmed edges the sheet is passed along gas flames 21, to be finally wound at 23 after having passed through a cooling space as shown at 22.

The lower run 4a of the conveyor belt 4 is cleaned during the return travel of the belt. In the example illustrated in FIGURE 1 a scraper 24 for the removal of sand and an additional cleaning scraper 25 are provided for this purpose.

Figure 4:
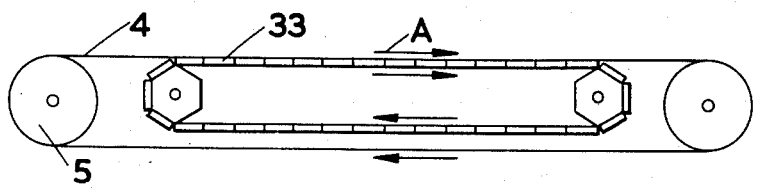
FIGURE 4 is an end elevation of one construction of components of the conveyor plant and cutting means of the apparatus according to the invention.

In the construction of apparatus according to the invention irregular edges may be produced on the coated mat which are trimmed by the slitting wheels 19, 20 (FIGURES 1 and 5). As shown in FIGURES 2–4 additional means by which the exact width of the sheet is ensured from the start may be provided thus avoiding the necessity for a final trimming of the edges.

These consist as shown in FIGURE 2 of endless limiting belts 26 and 27 made of steel mounted on rollers 31 to rotate in the same direction and at uniform speed, the space *b* between adjacent runs corresponding exactly to the predetermined width of the impregnated sheet of material to be produced. The space is maintained constant by rigid guides such, for example, as rails or bars 28, 29 and by the exact positioning of the shafts 30 of the rollers 31.

The width of the binder-free mat *t* which is deposited on the sanded surface of the belt thus corresponds exactly to the space between the laterally provided endless limiting belts 26, 27. Should the width of the binder-free mat be greater than this width, its edges may be turned up before it reaches the conveyor belt 4 by a suitable turning device, and, while this is being done, longitudinal reinforcing means such, for example as staple glass fibre slivers or rovings may be inserted to improve the resistance to tearing at the edges. An alternative method of obtaining the required width of the finished product consists in burning off the sides of the binder-free mat coated with a suitable gas burner.

As the conveyor belt has to run absolutely level in order to prevent the sprinkled material from trickling past the laterally provided limiting bands, the belt may be supported on slide rails 32 which may be made of brass or copper (FIGURE 3). The same object may be achieved by a supporting band as for example the jointed endless band 33 diagrammatically illustrated in FIGURE 4 which rotating on rollers at the same speed as the belt 4 supports the underside of the belt 4.

At their positions of reversal the limiting belts 26, 27 are provided with scrapers 34, 35 (FIGURE 2). Any contamination of the lateral bands can be removed on the return run by cleaning scrapers provided at suitable positions.

The liquid bituminous composition is applied onto the surface of the mat at a temperature of approximately 180° C. At this temperature the composition has a viscosity by virtue of which a uniform and rapid penetration of the body of the glass fibre mat is ensured. During this operation the binder-free mat lifts itself prior to the sanding operation and "floats" while at the same time being uniformly embedded in the mass of bitumen. This means that the body of the mat is wholly coated and the individual glass fibers or bundles of fibres are distributed throughout the body of the finished coating material, thus reinforcing the finished material to an extent so far not known for such material.

The apparatus illustrated in FIGURE 5 is different from that shown in FIGURES 1–4 in that the bituminous composition is fed by means of a short endless belt, for example by means of an endless steel belt 36 carried by four rollers. The belt 36 is sprayed with the bituminous composition by means of a spray pipe 37, the excess being withdrawn by a suction pipe 38 and the predetermined depth of layer being adjusted by a scraper 39.

An additional suction pipe 40 may be provided at the position at which the belt 36 comes into contact with the mat. A scraper 41 is provided to remove any remaining bituminous compound from the belt.

The advantages of the method of the invention and of the apparatus for carrying out these methods are as follows:

(1) The use of a binder-free mat increases the extensibility of the finished coated material.

(2) As a binder-free mat has the greatest porosity such a mat can be more quickly penetrated and better coated with a moating material, such as bitumen, tar or other of the heat plastic materials.

(3) As the binder-free mat is not subjected to pull or stress during the coating operation, such a mat cannot be distorted and consequently a fine uniform coated end product is obtained.

(4) The coat is applied onto and through one surface of the mat, thus avoiding the necessity of the mat being drawn through a bitumen coating bath with all its complications.

The method of the invention comprises the use of a loose glass fibre mat in which the individual staple fibres or fibre bundles are in a random pattern or orientated predominatingly in the direction of movement of the belt 4.

I claim:

1. A process of producing a coated roofing, pipe line or cable wrapping material using a glass fibre mat or the like as its membrane, comprising the steps of carrying a mat of loosely-arranged staple glass fibers on a conveyor belt, travelling a uniform layer of mineral dusting material on a non-pervious moving support in synchronized timed relationship to the movement of said glass fibre mat, said mat and layer of dusting material moving in the same direction but angularly inclined relative to each other, depositing said mat in tension-free condition onto the layer of dusting material, applying a bituminous binder as a coating material to the surface of said mat remote from said dusting layer, whereby said coating material seeps through the body of said fibre mat to form with the layer of dusting materials a wholly-coated and integrated finished product.

2. The process as defined in claim 1, including applying said bituminous material in heated molten condition onto and through the body of the fibre mat.

3. The process as defined in claim 1, including applying said bituminous material as granules or powder and subsequently applying heat and pressure to such materials.

4. A process as defined in claim 1, including applying granules as surfacing material to the surface of said coated fibre mat remote from said non-pervious support.

5. Apparatus for the production of a coated roofing, pipe line or cable wrapping material using a glass fibre mat or the like as its membrane, comprising a first endless conveyor system, means connecting said first conveyor system to a source of supply of preformed mat of loosely-arranged staple glass fibres, means mounting said conveyor for travel from said source of supply to a mat deposit station, a second endless conveyor of flexible non-pervious material, means for holding and feeding a layer of mineral binder dusting materials on said second endless conveyor, scraper means for insuring uniform distribution of said dusting material on said second endless conveyor, means mounting said second endless conveyor for movement past said mat discharge station, said second conveyor mounting means supporting said conveyor for movement at an inclination to said first endless conveyor system, operating means interconnecting said first and second endless conveyors for movement in synchronized timed relationship, whereby said preformed mat is deposited on said uniform layer of dusting materials on said second endless conveyor, and means for holding and feeding a bituminous coating material onto the free surface of said preformed mat to form a wholly-coated and integrated product.

6. Apparatus as defined in claim 5, including supporting means underneath the second conveyor and means to adjust its levelling.

7. Apparatus as defined in claim 5, comprising means to contain and feed granules as surfacing material to the surface of the finished product remote from said second conveyor and pressure rollers to embed such granules thereinto.

References Cited in the file of this patent

UNITED STATES PATENTS

| | | |
|---|---|---|
| 1,965,703 | Hyde | July 10, 1934 |
| 2,404,207 | Ball | July 26, 1946 |
| 2,681,870 | Novak | June 22, 1954 |
| 2,904,453 | Labino | Sept. 15, 1959 |